(12) United States Patent
Zhang et al.

(10) Patent No.: US 11,445,224 B2
(45) Date of Patent: Sep. 13, 2022

(54) SHAPE OF EQT SUBBLOCK

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Hsiao Chiang Chuang, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/110,009

(22) Filed: Dec. 2, 2020

(65) Prior Publication Data

US 2021/0092378 A1 Mar. 25, 2021

Related U.S. Application Data

(63) Continuation of application No. PCT/IB2019/054617, filed on Jun. 4, 2019.

(30) Foreign Application Priority Data

Jun. 5, 2018 (WO) ................ PCT/CN2018/089918

(51) Int. Cl.
*H04N 19/46* (2014.01)
*H04N 19/96* (2014.01)
(Continued)

(52) U.S. Cl.
CPC ........... *H04N 19/96* (2014.11); *H04N 19/119* (2014.11); *H04N 19/176* (2014.11);
(Continued)

(58) Field of Classification Search
CPC .... H04N 19/46; H04N 19/119; H04N 19/176; H04N 19/189
See application file for complete search history.

(56) References Cited

U.S. PATENT DOCUMENTS 8,204,109 B2 6/2012 Xiong et al.
8,548,057 B2 10/2013 Li et al.
(Continued)

FOREIGN PATENT DOCUMENTS

CN 101584219 A 11/2009
CN 102761742 A 10/2012
(Continued)

OTHER PUBLICATIONS

Extended Quad Tree and Partitioning Google Search, retrieved on Dec. 18, 2020.
(Continued)

*Primary Examiner* — Tsion B Owens
(74) *Attorney, Agent, or Firm* — Perkins Coie LLP

(57) ABSTRACT

Methods, systems and devices for using flexible and efficient partitioning techniques, and in particular, sub-block shapes in extended quadtree partitioning, are described. An exemplary method for visual media decoding includes applying, to a current visual media block, a partitioning process that splits the current visual media block into exactly four sub-blocks including at least one sub-block that has a size different from half of a width of the current visual media block times half of a height of the current visual media block, where a size of the current visual media block is M×N, and the size of the at least one sub-block is based on a minimum value between M and N, or a maximum value between M and N; decoding, based on a bitstream repre-
(Continued)

sentation, the four sub-blocks; and decoding, based on the four sub-blocks and the partitioning process, the current visual media block.

20 Claims, 13 Drawing Sheets

(51) Int. Cl.
    *H04N 19/176*     (2014.01)
    *H04N 19/184*     (2014.01)
    *H04N 19/119*     (2014.01)
    *H04N 19/189*     (2014.01)
    *H04N 19/169*     (2014.01)

(52) U.S. Cl.
    CPC ......... *H04N 19/184* (2014.11); *H04N 19/189* (2014.11); *H04N 19/1883* (2014.11); *H04N 19/46* (2014.11)

(56) References Cited

U.S. PATENT DOCUMENTS

| | | | |
|---|---|---|---|
| 8,804,816 B2 | 8/2014 | Li et al. |
| 9,077,998 B2 | 7/2015 | Wang et al. |
| 9,420,282 B2 | 8/2016 | Li et al. |
| 9,544,612 B2 | 1/2017 | Deng et al. |
| 9,584,822 B2 | 2/2017 | Deng et al. |
| 9,648,335 B2 | 5/2017 | Rapaka et al. |
| 9,667,942 B2 | 5/2017 | Chen et al. |
| 9,667,990 B2 | 5/2017 | Chen et al. |
| 9,749,645 B2 | 8/2017 | Li et al. |
| 9,749,661 B2 | 8/2017 | Wang et al. |
| 9,838,684 B2 | 12/2017 | Coban et al. |
| 9,979,975 B2 | 5/2018 | Rapaka et al. |
| 10,057,574 B2 | 8/2018 | Li et al. |
| 10,200,700 B2 | 2/2019 | Zhang et al. |
| 10,264,271 B2 | 4/2019 | Li et al. |
| 10,326,989 B2 | 6/2019 | Hong et al. |
| 10,368,051 B2 | 7/2019 | Jiang et al. |
| 10,382,754 B2 | 8/2019 | Li et al. |
| 10,390,029 B2 | 8/2019 | Ye et al. |
| 10,390,050 B2 | 8/2019 | An et al. |
| 10,506,246 B2 | 12/2019 | Li et al. |
| 10,609,423 B2 | 3/2020 | Chuang et al. |
| 10,687,079 B2 | 6/2020 | Liu et al. |
| 10,721,467 B2 | 7/2020 | Son et al. |
| 10,812,835 B2 | 10/2020 | Wang et al. |
| 10,904,581 B2 | 1/2021 | Lee |
| 10,972,731 B2 | 4/2021 | Wang et al. |
| 10,972,758 B2 | 4/2021 | Karczewicz et al. |
| 11,051,023 B2 | 6/2021 | Lee |
| 11,070,801 B2 | 7/2021 | Yasugi et al. |
| 11,240,499 B2 | 2/2022 | Liu et al. |
| 11,265,584 B2 | 3/2022 | Zhang et al. |
| 2002/0181794 A1 | 12/2002 | Lee |
| 2009/0052534 A1 | 2/2009 | Wang et al. |
| 2012/0170653 A1 | 7/2012 | Panusopone et al. |
| 2013/0107950 A1 | 5/2013 | Guo et al. |
| 2013/0163664 A1* | 6/2013 | Guo ................... H04N 19/157 |
| | | 375/240.12 |
| 2014/0294084 A1 | 10/2014 | Cheon |
| 2014/0334543 A1 | 11/2014 | Lee et al. |
| 2015/0043641 A1 | 2/2015 | Gamei et al. |
| 2015/0195570 A1 | 7/2015 | Zhang et al. |
| 2016/0050440 A1 | 2/2016 | Liu et al. |
| 2017/0006309 A1 | 1/2017 | Liu et al. |
| 2017/0048552 A1 | 2/2017 | An et al. |
| 2017/0085886 A1 | 3/2017 | Jacobson et al. |
| 2017/0118486 A1 | 4/2017 | Rusanovskyy |
| 2017/0150186 A1 | 5/2017 | Zhang et al. |
| 2017/0208336 A1 | 7/2017 | Li et al. |
| 2017/0244964 A1 | 8/2017 | Liu et al. |
| 2017/0272750 A1 | 9/2017 | An et al. |
| 2017/0272759 A1 | 9/2017 | Seregin et al. |
| 2017/0272782 A1 | 9/2017 | Li et al. |
| 2017/0332100 A9 | 11/2017 | Zhang et al. |
| 2017/0347095 A1 | 11/2017 | Panusopone et al. |
| 2017/0347096 A1 | 11/2017 | Hong et al. |
| 2017/0347123 A1 | 11/2017 | Panusopone et al. |
| 2017/0347128 A1 | 11/2017 | Panusopone et al. |
| 2018/0027236 A1 | 1/2018 | Jeon et al. |
| 2018/0070110 A1 | 3/2018 | Chuang et al. |
| 2018/0077417 A1 | 3/2018 | Huang |
| 2018/0098097 A1 | 4/2018 | Huang et al. |
| 2018/0103268 A1 | 4/2018 | Huang et al. |
| 2018/0109812 A1 | 4/2018 | Tsai et al. |
| 2018/0109814 A1 | 4/2018 | Chuang et al. |
| 2018/0131952 A1 | 5/2018 | Xiu et al. |
| 2018/0139444 A1 | 5/2018 | Huang et al. |
| 2018/0139453 A1 | 5/2018 | Park et al. |
| 2018/0160113 A1 | 6/2018 | Jeong et al. |
| 2018/0176601 A1 | 6/2018 | Jeong et al. |
| 2018/0199072 A1 | 7/2018 | Li et al. |
| 2019/0116374 A1 | 4/2019 | Zhang et al. |
| 2019/0246122 A1 | 8/2019 | Zhang et al. |
| 2019/0246143 A1 | 8/2019 | Zhang et al. |
| 2019/0268623 A1 | 8/2019 | Lee |
| 2019/0273922 A1 | 9/2019 | Lim et al. |
| 2019/0273923 A1 | 9/2019 | Huang et al. |
| 2019/0273931 A1 | 9/2019 | Lim et al. |
| 2019/0306538 A1 | 10/2019 | Karczewicz et al. |
| 2019/0313129 A1* | 10/2019 | Lee .................. H04N 19/96 |
| 2019/0342550 A1 | 11/2019 | Lim et al. |
| 2019/0356925 A1 | 11/2019 | Ye et al. |
| 2019/0364275 A1 | 11/2019 | Li et al. |
| 2019/0364278 A1 | 11/2019 | Lee |
| 2019/0364279 A1 | 11/2019 | Yasugi et al. |
| 2019/0387226 A1 | 12/2019 | Lee |
| 2020/0186805 A1 | 6/2020 | Lee |
| 2020/0195924 A1 | 6/2020 | Hsiang |
| 2020/0213590 A1 | 7/2020 | Kim et al. |
| 2020/0236353 A1 | 7/2020 | Zhang et al. |
| 2020/0252609 A1 | 8/2020 | Filippov et al. |
| 2020/0267418 A1 | 8/2020 | Chuang et al. |
| 2020/0304788 A1 | 9/2020 | He et al. |
| 2020/0336748 A1 | 10/2020 | Li et al. |
| 2020/0344475 A1 | 10/2020 | Zhu et al. |
| 2020/0374520 A1 | 11/2020 | Liu et al. |
| 2020/0382807 A1 | 12/2020 | Liu |
| 2020/0404257 A1 | 12/2020 | Filippov et al. |
| 2021/0014479 A1 | 1/2021 | Lee |
| 2021/0014490 A1 | 1/2021 | Wieckowski et al. |
| 2021/0051348 A1 | 2/2021 | Zhang et al. |
| 2021/0051349 A1 | 2/2021 | Zhang et al. |
| 2021/0058647 A1 | 2/2021 | Zhang et al. |
| 2021/0092377 A1 | 3/2021 | Zhang et al. |
| 2021/0105507 A1 | 4/2021 | Lee |
| 2021/0105508 A1 | 4/2021 | Lee |
| 2021/0112248 A1 | 4/2021 | Zhang et al. |
| 2021/0112284 A1 | 4/2021 | Zhang et al. |
| 2021/0120243 A1 | 4/2021 | Zhang et al. |
| 2021/0136369 A1 | 5/2021 | Lim et al. |

FOREIGN PATENT DOCUMENTS

| | | |
|---|---|---|
| CN | 103503461 A | 1/2014 |
| CN | 104081777 A | 10/2014 |
| CN | 104137545 A | 11/2014 |
| CN | 106254890 A | 12/2016 |
| CN | 107005718 A | 8/2017 |
| CN | 107071497 A | 8/2017 |
| CN | 107409207 A | 11/2017 |
| CN | 107431815 A | 12/2017 |
| CN | 107613297 A | 1/2018 |
| CN | 107682707 A | 2/2018 |
| CN | 107836117 A | 3/2018 |
| KR | 20160108958 A | 9/2016 |
| KR | 20180051424 A | 5/2018 |
| WO | 2017205700 A1 | 11/2017 |
| WO | 2017222331 A1 | 12/2017 |
| WO | 2018045332 A1 | 3/2018 |

(56) References Cited

FOREIGN PATENT DOCUMENTS

| WO | 2018056702 A1 | 3/2018 |
| WO | 2018088805 A1 | 5/2018 |
| WO | 2018092868 A1 | 5/2018 |

OTHER PUBLICATIONS

Kawamura et al. "Asymmetric Partitioning with Non-power-of-two Transform for Intra Coding," 2012 Picture Coding Symposium, Krakow Poland, May 7-9, 2012, pp. 429-432.
Kim et al. "Block Partitioning Structure in the HEVC Standard," IEEE Transactions on Circuits and Systems for Video Technology, Dec. 2012, 22(12):1697-1706.
Li et al. "Multi-Type-Tree." Joint Video Exploration Team (JVET), of ITU-T SG 16 WP 3 and ISO/IEC JTC 1/SC 29/WG 11, 4th Meeting: Chengdu, CN, Oct. 15-21, 2016, document JVET-D0117rl, 2016.
Lucas et al. "Intra Predictive Depth Map Coding Using Flexible Block Partitioning," IEEE Transactions on Image Processing, Nov. 2015, 24(11):4055-4068.
Luthra et al. Overview of the H.264/AVC Video Coding Standard, Proc. SPIE, 5203, Applications of Digital Image Processing, Nov. 19, 2003, Optical Science and Technology, SPIE 48th annutal Meeting, San Diego, CA, US, 2003.
Ma et al. "Description of Core Experiment 1 (CE1): Partitioning," Joint Video Exploration Team (JVEI) of ITU-T SG 16 WP 3 and ISO/IEC JTC 1/SC 29/WG 11, 10th Meeting: San Diego, US, Apr. 10-20, 2018, document JVET-J1021, 2019.
Misra et al. "Description of SDR and HDR Video Coding Technology Proposal by Sharp and Foxconn," Joint Video Exploration Team (JVET) of ITU-T SG 16 WP 3 and ISO/IEC JTC 1/SC 29/WG 11, 10th Meeting: San Diego, US, Apr. 10-20, 2018, document JVET-J0026, 2018.
Sullivan et al. "Overview of the High Efficiency Video Coding (HEVC) Standard," IEEE Transactions on Circuits and Systems for Video Technology, Dec. 2012, 22(12):1649-1668.
Wang et al. "Local-Constrained Quadtree Plus Binary Tree Block Partition Structure for Enhanced Video Coding," 2016 Visual Communications and Image Processing (VCIP), Chengdu, 2016, pp. 1-4.
Wang et al. "Derived Tree Block Partitioning for AVS3 Intra Coding," 2019 Picture Coding Symposium (PCS), Ningbo, China, 2019, pp. 1-5.
Wang et al. "Extended Quad-tree Partitioning for Future Video Coding," 2019 Data Conference (DCC), pp. 300-309.
Yuan et al. "Quadtree Based Nonsquare Block Structure for Inter Frame Coding in High Efficiency Video Coding," EEE Transactions on Circuits and Systems for Video Technology, Dec. 2012, 22(12)1707-1719.
International Search Report and Written Opinion from PCT/IB2019/054609 dated Oct. 7, 2019 (56 pages).
International Search Report and Written Opinion from PCT/IB2019/054610 dated Oct. 7, 2019 (56 pages).
International Search Report and Written Opinion from PCT/IB2019/054613 dated Oct. 7, 2019 (59 pages).
International Search Report and Written Opinion from PCT/IB2019/054617 dated Oct. 7, 2019 (55 pages).
International Search Report and Written Opinion from PCT/IB2019/054618 dated Oct. 7, 2019 (56 pages).
International Search Report and Written Opinion from PCT/IB2019/054656 dated Oct. 7, 2019 (57 pages).
Non-Final Office Action from U.S. Appl. No. 17/090,414 dated Dec. 28, 2020.
Non-Final Office Action from U.S. Appl. No. 17/090,364 dated Dec. 30, 2020.
Non-Final Office Action from U.S. Appl. No. 17/090,276 dated Jan. 6, 2021.
Extended Quad Tree and Partitioning Google Search, retrieved on Apr. 23, 2021.
Final Office Action from U.S. Appl. No. 17/090,414 dated Apr. 29, 2021.
Advisory Action from U.S. Appl. No. 17/090,364 dated Jul. 14, 2021.
Non-Final Office Action from U.S. Appl. No. 17/110,052 dated Jul. 20, 2021.
Non-Final Office Action from U.S. Appl. No. 17/090,276 dated Aug. 13, 2021.
Notice of Allowance from U.S. Appl. No. 17/090,364 dated Oct. 27, 2021.
Final Office Action from U.S. Appl. No. 17/090,276 dated Dec. 6, 2021.
Final Office Action from U.S. Appl. No. 17/110,052 dated Dec. 24, 2021.
Notice of Allowance from U.S. Appl. No. 17/090,276 dated Mar. 7, 2022.
Final Office Action from U.S. Appl. No. 17/090,414 dated May 24, 2022.
Jiang Jie, "Research on the High Efficiency Video Intra Coding," Doctoral Dissertation Xidian University, 2012, China Academic Journal Electronic Publishing House, (cited in CN201910488490.7 OA mailed Mar. 3, 2022).
Nandi et al. "Fractal Image Compression with Quadtree Partitioning and a New Fast Classification Strategy," 2015 IEEE, Proceedings of the 2015 Third International Conference on Computer, Communication , Control and Information Technology, (cited in CN201910488490.7 OA mailed Mar. 3, 2022).
Ma et al. "Quadtree Plus Binary Tree with Shifting (Including Software)," Joint Video Exploration Team (JVET) of ITU-T SG 16 WP 3 and ISO/IEC JTC 1/SC 29/WG 11 10th Meeting: San Diego, US, Apr. 10-20, 2018, document JVET-U0035, 2018. (cited in CN201910487908.2 FOA mailed Jun. 2, 2022).

* cited by examiner

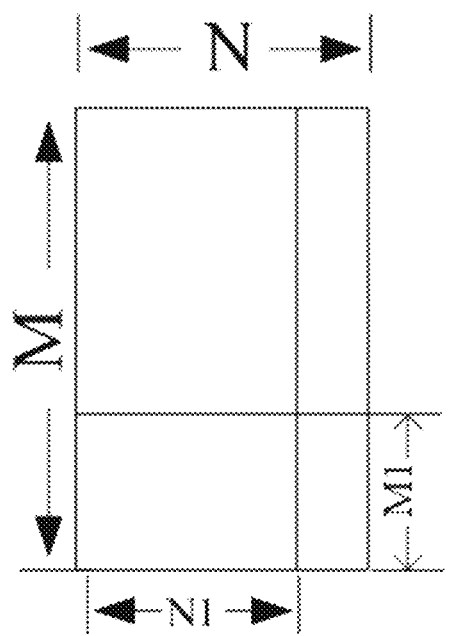
FIG. 7I
FIG. 7K
FIG. 7J

SHAPE OF EQT SUBBLOCK

CROSS-REFERENCE TO RELATED APPLICATIONS

This application is a continuation of International Application No. PCT/IB2019/054617, filed on Jun. 4, 2019, which claims the priority to and benefits of International Patent Application No. PCT/CN2018/089918, filed on Jun. 5, 2018. The entire disclosures of the aforementioned applications are incorporated by reference as part of the disclosure of this application in their entireties.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

This patent document discloses methods, systems, and devices for encoding and decoding digital video by partitioning video pictures using flexible and efficient partitioning techniques, and in particular, sub-block shapes in extended quadtree (EQT) partitioning.

In one example aspect, a visual media decoding method is disclosed. The method includes applying, to a current visual media block, a partitioning process that splits the current visual media block into exactly four sub-blocks including at least one sub-block that has a size different from half of a width of the current visual media block times half of a height of the current visual media block, where a size of the current visual media block is M×N, M and N are positive integers, and the size of the at least one sub-block is based on a minimum value between M and N, or a maximum value between M and N; decoding, based on a bitstream representation, the four sub-blocks; and decoding, based on the four sub-blocks and the partitioning process, the current visual media block.

In another example aspect, a visual media encoding method is disclosed. The method includes receiving input data associated with a current visual media block; applying, to the input data, a partitioning process that splits the current visual media block into exactly four sub-blocks including at least one sub-block that has a size different from half of a width of the current visual media block times half of a height of the current visual media block, where a size of the current visual media block is M×N pixels, M and N are positive integers, and the size of the at least one sub-block is based on a minimum value between M and N, or a maximum value between M and N; encoding, based on the partitioning process, the four sub-blocks; and generating, based on the encoding, a bitstream representation of the current visual media block.

In yet another example aspect, a visual media decoding method is disclosed. The method includes applying, to a current visual media block, a partitioning process that splits the current visual media block into exactly four sub-blocks including at least one sub-block that has a size different from half of a width of the current visual media block times half of a height of the current visual media block, wherein a size of the current visual media block is M×N, wherein M and N are positive integers, wherein a first size of a first sub-block and a second sub-block of the four sub-blocks is $(M*w0/w) \times (N*h0/h)$, and wherein a second size of a third sub-block and a fourth sub-block of the four blocks is $(M*(w-w0)/w) \times (N*(h-h0)/h)$, wherein w, h, w0 and h0 are positive integers, and wherein $w0 \leq w$ and $h0 \leq h$; decoding, based on a bitstream representation, the four sub-blocks; and decoding, based on the four sub-blocks and the partitioning process, the current visual media block.

In yet another example aspect, a visual media encoding method is disclosed. The method includes receiving input data associated with a current visual media block; applying, to the input data, a partitioning process that splits the current visual media block into exactly four sub-blocks including at least one sub-block that has a size different from half of a width of the current visual media block times half of a height of the current visual media block, wherein a size of the current visual media block is M×N pixels, wherein M and N are positive integers, wherein a first size of a first sub-block and a second sub-block of the four sub-blocks is $(M*w0/w) \times (N*h0/h)$, and wherein a second size of a third sub-block and a fourth sub-block of the four blocks is $(M*(w-w0)/w) \times (N*(h-h0)/h)$, wherein w, h, w0 and h0 are positive integers, and wherein $w0 \leq w$ and $h0 \leq h$; encoding, based on the partitioning process, the four sub-blocks; and generating, based on the encoding, a bitstream representation of the current visual media block.

In yet another example aspect, a visual media encoder device that implements a visual media encoding method described herein is disclosed.

In yet another representative aspect, the various techniques described herein may be embodied as a computer program product stored on a non-transitory computer readable media. The computer program product includes program code for carrying out the methods described herein.

In yet another representative aspect, a visual media decoder apparatus may implement a method as described herein.

The details of one or more implementations are set forth in the accompanying attachments, the drawings, and the description below. Other features will be apparent from the description and drawings, and from the claims.

BRIEF DESCRIPTION OF THE DRAWINGS

FIGS. 7A to 7K illustrate examples of partitioning one block to multiple partitions.

DETAILED DESCRIPTION

To improve compression ratio of video, researchers are continually looking for new techniques by which to encode video.

1. Overview of Some Aspects Disclosed in the Present Document

This patent document is related to image/video coding, especially on the partition structure, i.e., how to split one Coding Tree Unit (CTU) into multiple Coding Units (CUs) or how to split one CU into multiple smaller CUs. It may be applied to the existing video coding standard like HEVC, or the standard (Versatile Video Coding) to be finalized. It may be also applicable to future video coding standards or video codec. The techniques described in the present document may be applied for encoding and decoding a video, e.g., a sequence of pictures or images. The techniques may also be used for encoding and decoding of a single picture or an image. Accordingly, the techniques are applicable to encoding or decoding of visual media in the form of video or images. For improved readability, the word "video" is used throughout most of the description to mean video or an image.

2. Discussion

Figure 1:
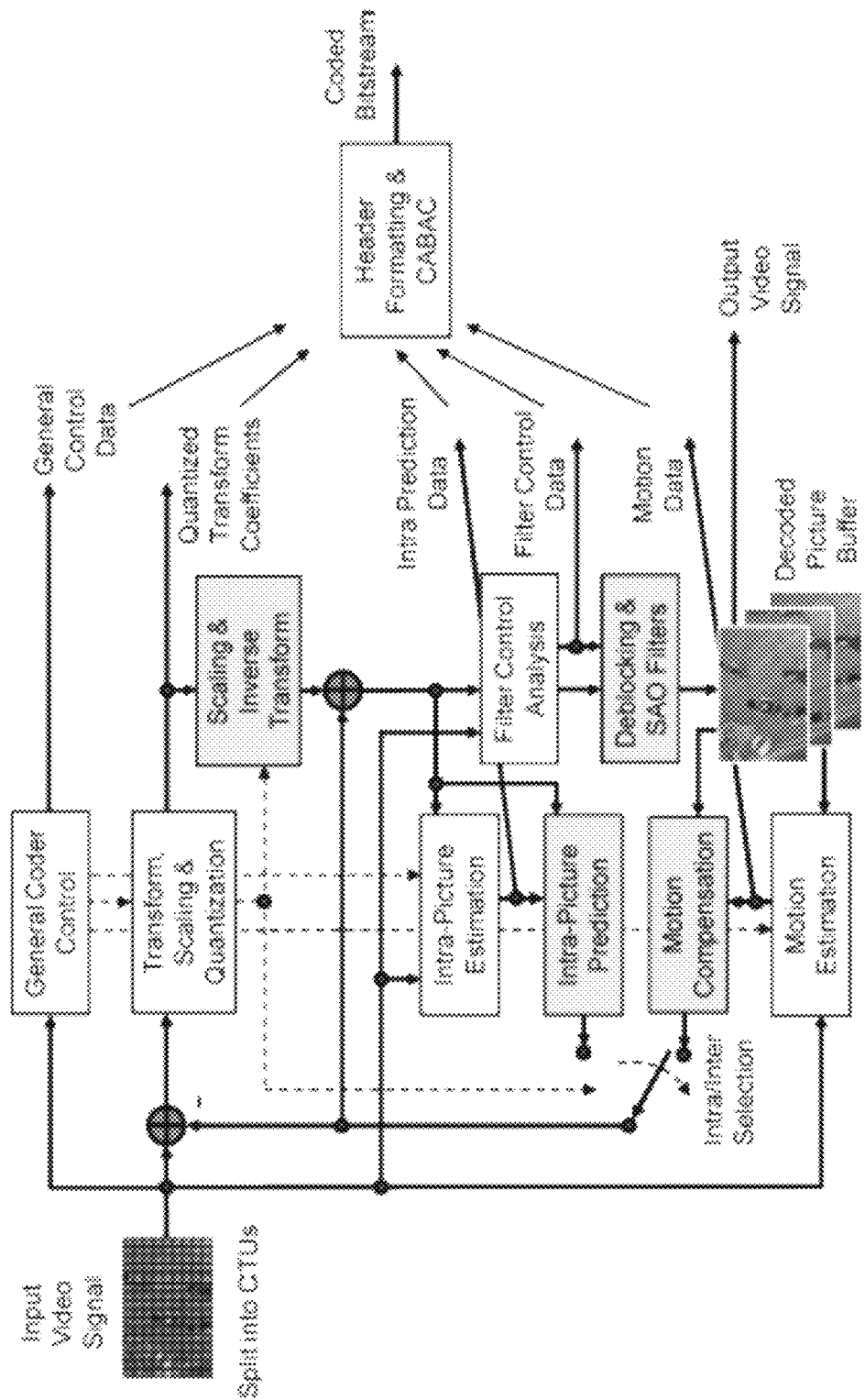
FIG. 1 is a block diagram showing an example of a video encoder implementation

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. An example of a typical HEVC encoder framework is depicted shown in FIG. 1.

2.1 Partition Tree Structure in H.264/AVC

The core of the coding layer in previous standards was the macroblock, containing a 16×16 block of luma samples and, in the usual case of 4:2:0 color sampling, two corresponding 8×8 blocks of chroma samples.

An intra-coded block uses spatial prediction to exploit spatial correlation among pixels. Two partitions are defined: 16×16 and 4×4.

Figure 2:
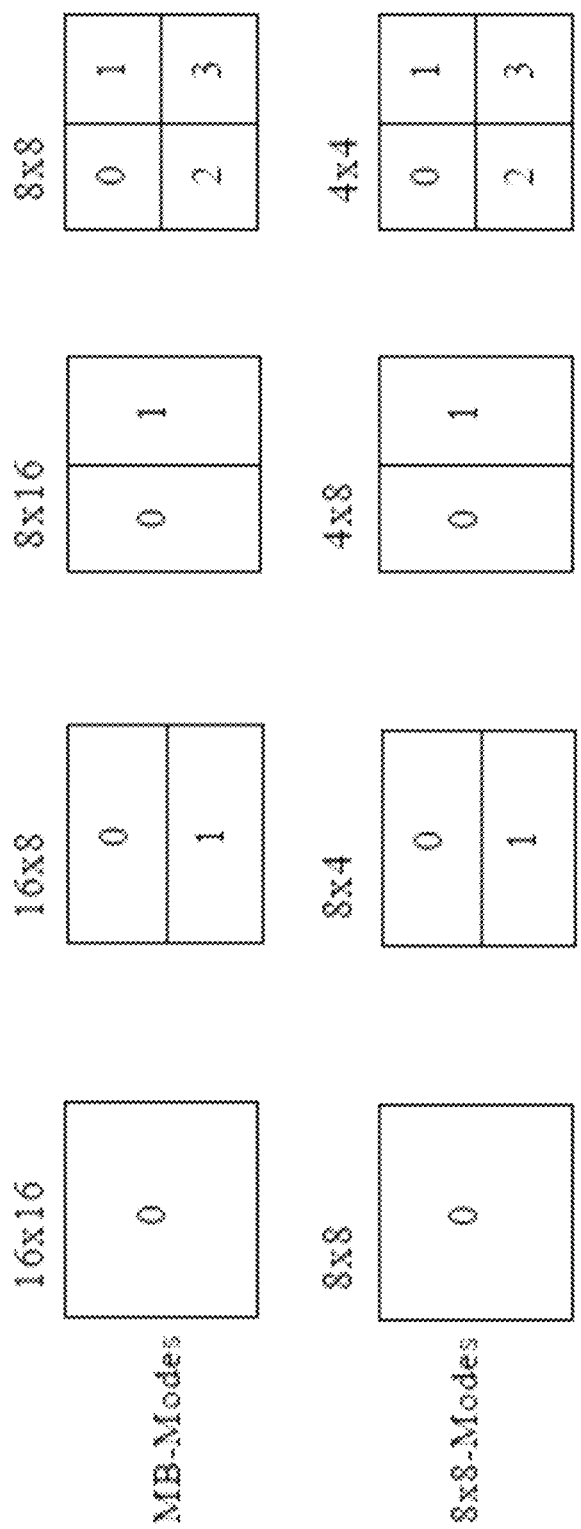
FIG. 2 illustrates macroblock partitioning in the H.264 video coding standard.

An inter-coded block uses temporal prediction, instead of spatial prediction, by estimating motion among pictures. Motion can be estimated independently for either 16×16 macroblock or any of its sub-macroblock partitions: 16×8, 8×16, 8×8, 8×4, 4×8, 4×4 (see FIG. 2) [2]. Only one motion vector (MV) per sub-macroblock partition is allowed.

2.2 Partition Tree Structure in HEVC

In HEVC, a CTU is split into CUs by using a quadtree structure denoted as coding tree to adapt to various local characteristics. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key feature of the HEVC structure is that it has the multiple partition conceptions including CU, PU, and TU.

In the following, the various features involved in hybrid video coding using HEVC are highlighted as follows.

1) Coding tree units and coding tree block (CTB) structure: The analogous structure in HEVC is the coding tree unit (CTU), which has a size selected by the encoder and can be larger than a traditional macroblock. The CTU consists of a luma CTB and the corresponding chroma CTBs and syntax elements. The size L×L of a luma CTB can be chosen as L=16, 32, or 64 samples, with the larger sizes typically enabling better compression. HEVC then supports a partitioning of the CTBs into smaller blocks using a tree structure and quadtree-like signaling.

2) Coding units (CUs) and coding blocks (CBs): The quadtree syntax of the CTU specifies the size and positions of its luma and chroma CBs. The root of the quadtree is associated with the CTU. Hence, the size of the luma CTB is the largest supported size for a luma CB. The splitting of a CTU into luma and chroma CBs is signaled jointly. One luma CB and ordinarily two chroma CBs, together with associated syntax, form a coding unit (CU). A CTB may contain only one CU or may be split to form multiple CUs, and each CU has an associated partitioning into prediction units (PUs) and a tree of transform units (TUs).

Figure 3:
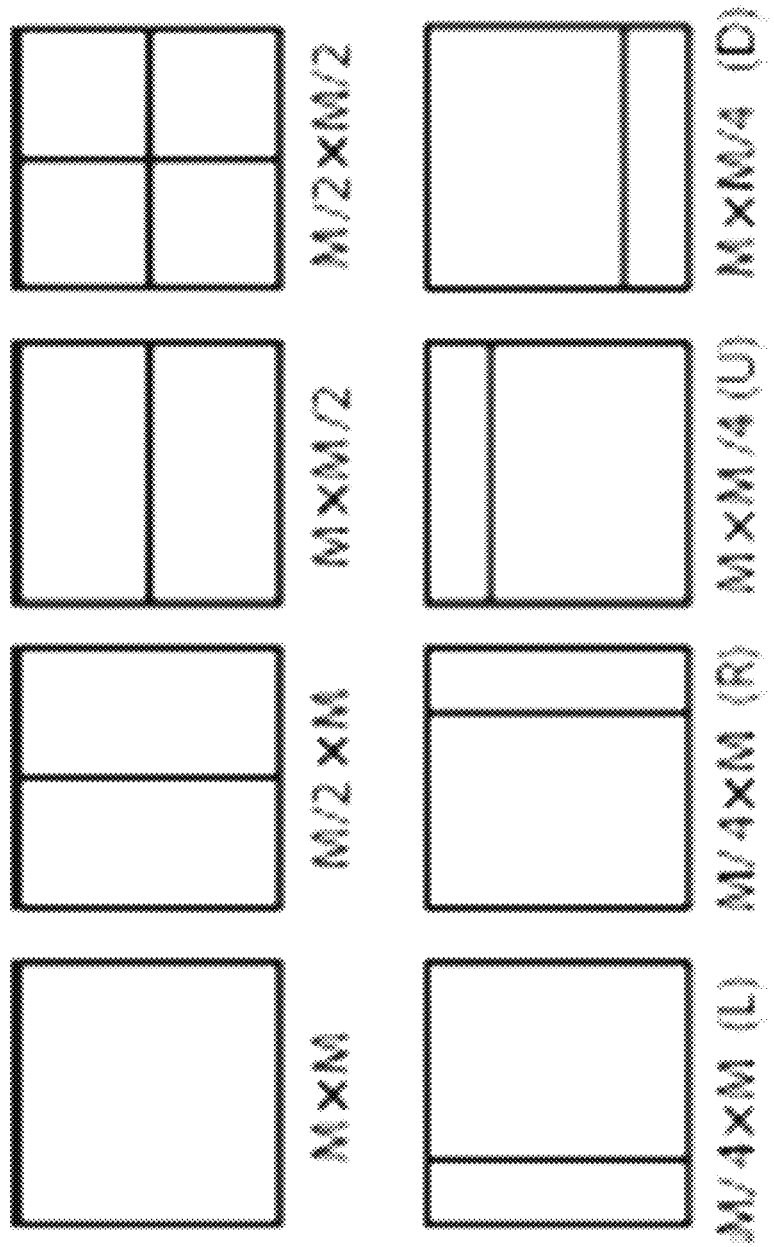
FIG. 3 illustrates an example of splitting coding blocks (CB) into prediction blocks (PU).

3) Prediction units and prediction blocks (PBs): The decision whether to code a picture area using inter picture or intra picture prediction is made at the CU level. A PU partitioning structure has its root at the CU level. Depending on the basic prediction-type decision, the luma and chroma CBs can then be further split in size and predicted from luma and chroma prediction blocks (PBs). HEVC supports variable PB sizes from 64×64 down to 4×4 samples. FIG. 3 shows examples of allowed PBs for a M×M CU.

4) TUs and transform blocks: The prediction residual is coded using block transforms. A TU tree structure has its root at the CU level. The luma CB residual may be identical to the luma transform block (TB) or may be further split into smaller luma TBs. The same applies to the chroma TBs. Integer basis functions similar to those of a discrete cosine transform (DCT) are defined for the square TB sizes 4×4, 8×8, 16×16, and 32×32. For the 4×4 transform of luma intra picture prediction residuals, an integer transform derived from a form of discrete sine transform (DST) is alternatively specified.

Tree-Structured Partitioning Into Transform Blocks and Units

Figure 4:
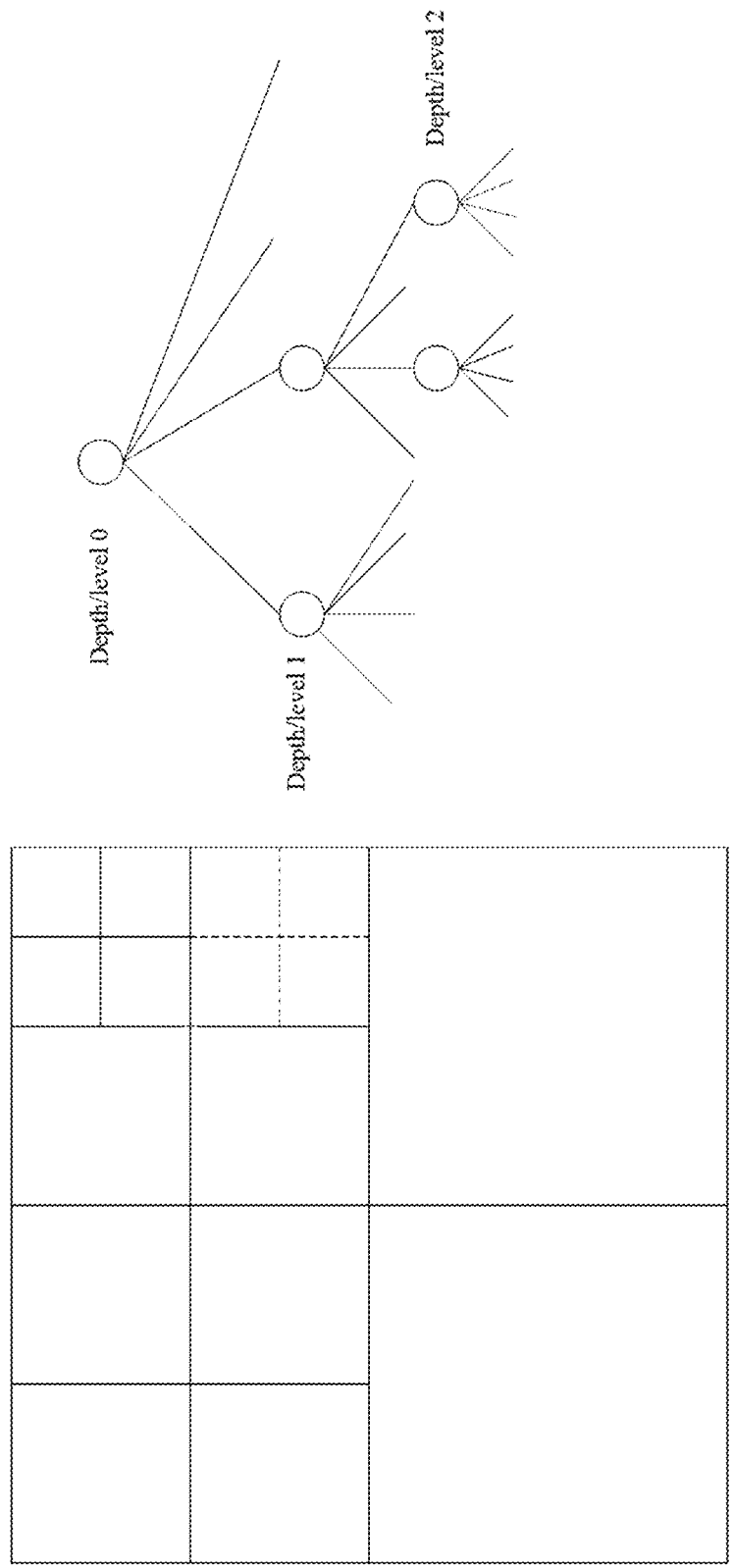
FIG. 4 illustrates an example implementation for subdivision of a CTB into CBs and transform block (TBs). Solid lines indicate CB boundaries and dotted lines indicate TB boundaries, including an example CTB with its partitioning, and a corresponding quadtree.

For residual coding, a CB can be recursively partitioned into transform blocks (TBs). The partitioning is signaled by a residual quadtree. Only square CB and TB partitioning is specified, where a block can be recursively split into quadrants, as illustrated in FIG. 4. For a given luma CB of size M×M, a flag signals whether it is split into four blocks of size M/2×M/2. If further splitting is possible, as signaled by a maximum depth of the residual quadtree indicated in the SPS, each quadrant is assigned a flag that indicates whether it is split into four quadrants. The leaf node blocks resulting from the residual quadtree are the transform blocks that are further processed by transform coding. The encoder indicates the maximum and minimum luma TB sizes that it will use. Splitting is implicit when the CB size is larger than the maximum TB size. Not splitting is implicit when splitting would result in a luma TB size smaller than the indicated minimum. The chroma TB size is half the luma TB size in each dimension, except when the luma TB size is 4×4, in which case a single 4×4 chroma TB is used for the region covered by four 4×4 luma TBs. In the case of intrapicture-predicted CUs, the decoded samples of the nearest-neighboring TBs (within or outside the CB) are used as reference data for intrapicture prediction.

In contrast to previous standards, the HEVC design allows a TB to span across multiple PBs for interpicture-predicted CUs to maximize the potential coding efficiency benefits of the quadtree-structured TB partitioning.

2.3 Quadtree Plus Binary Tree (QTBT) Block Structure with Larger CTUs in JEM

To explore the future video coding technologies beyond HEVC, Joint Video Exploration Team (JVET) was founded by VCEG and MPEG jointly in 2015. Since then, many new methods [3] have been adopted by JVET and put into the reference software named Joint Exploration Model (JEM) [4].

2.3.1 QTBT Block Partitioning Structure

Figure 5A:
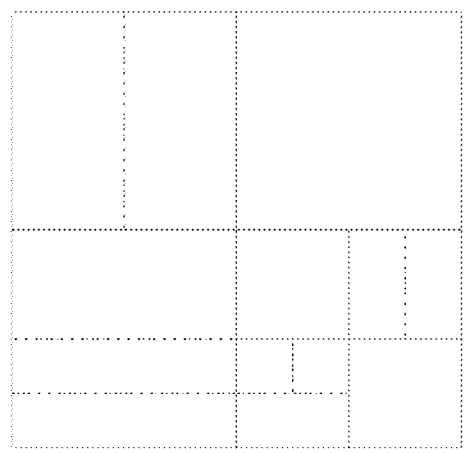
FIGS. 5A and 5B show an example of a Quad Tree Binary Tree (QTBT) structure for partitioning video data.
Figure 5B:
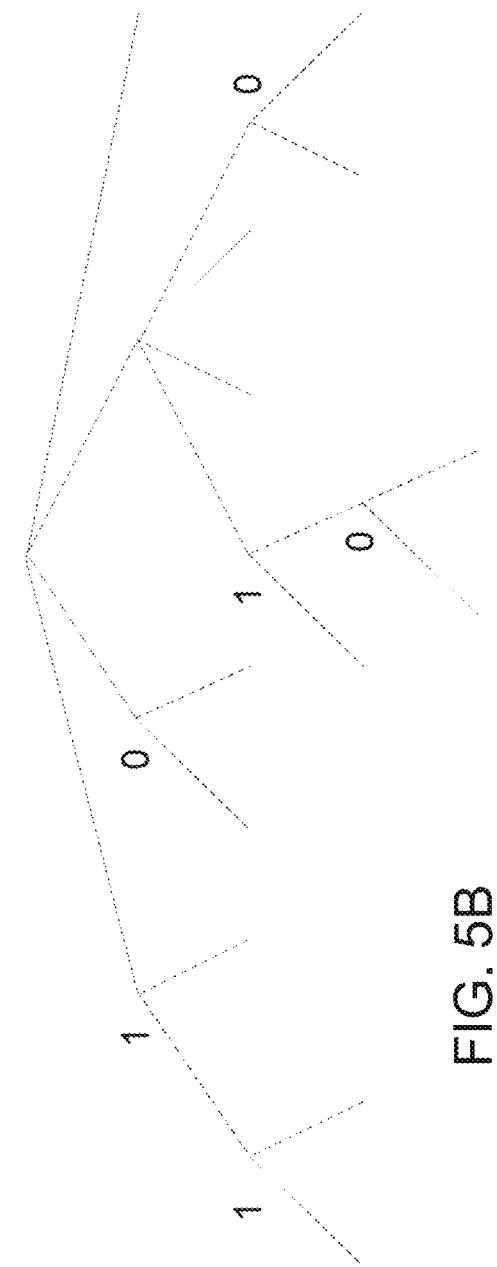

Different from HEVC [5], the QTBT structure removes the concepts of multiple partition types, i.e. it removes the separation of the CU, PU and TU concepts, and supports more flexibility for CU partition shapes. In the QTBT block structure, a CU can have either a square or rectangular shape. As shown in FIGS. 5A and 5B, a coding tree unit (CTU) is first partitioned by a quadtree structure. The quadtree leaf nodes are further partitioned by a binary tree structure. There are two splitting types, symmetric horizontal splitting and symmetric vertical splitting, in the binary tree splitting. The binary tree leaf nodes are called coding units (CUs), and that segmentation is used for prediction and transform processing without any further partitioning. This means that the CU, PU and TU have the same block size in the QTBT coding block structure. In the JEM, a CU sometimes consists of coding blocks (CBs) of different colour components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme.

CTU size: the root node size of a quadtree, the same concept as in HEVC
MinQTSize: the minimally allowed quadtree leaf node size
MaxBTSize: the maximally allowed binary tree root node size
MaxBTDepth: the maximally allowed binary tree depth
MinBTSize: the minimally allowed binary tree leaf node size In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

FIG. 5A depicts an example of block partitioning by using QTBT, and FIG. 5B illustrates the corresponding tree representation. The solid lines indicate quadtree splitting and dotted lines indicate binary tree splitting. In each splitting (i.e., non-leaf) node of the binary tree, one flag is signalled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

2.4 Ternary Tree for WC

Figure 6:
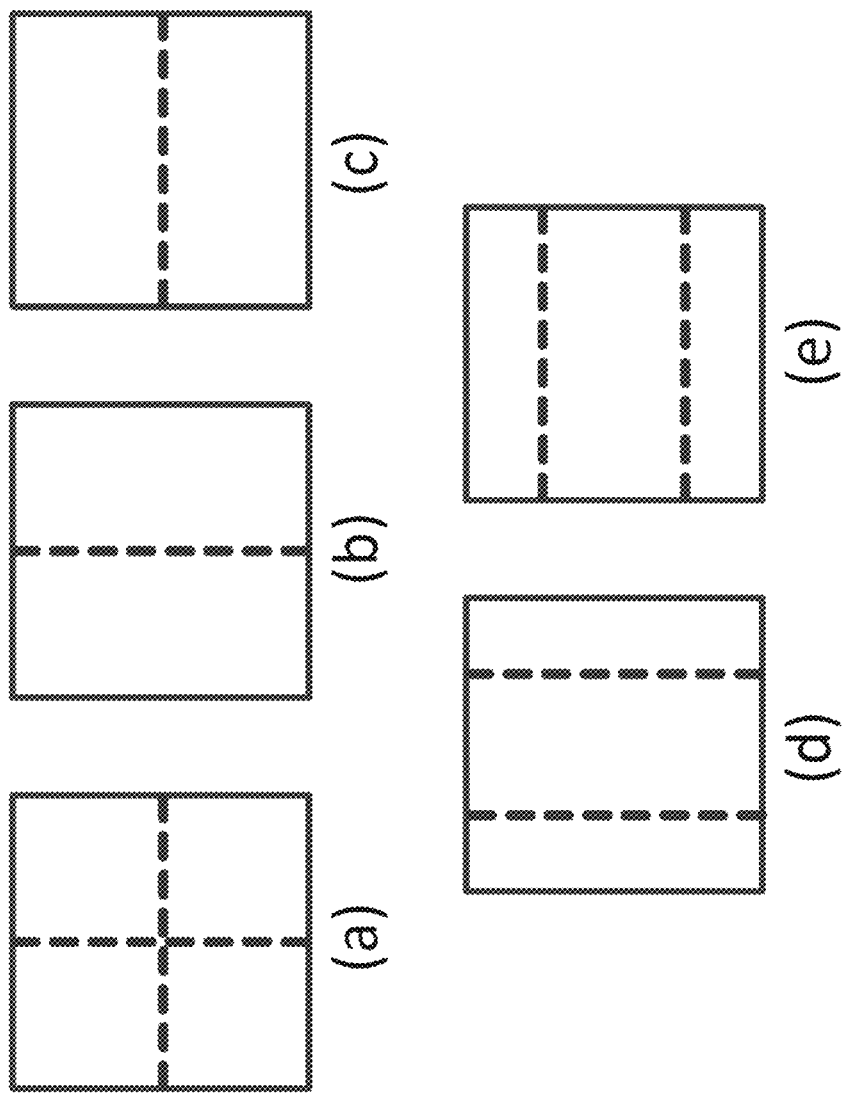
FIG. 6 shows examples of (a) quad-tree partitioning (b) vertical binary-tree partitioning (c) horizontal binary-tree partitioning (d) vertical center-side ternary-tree partitioning (e) horizontal center-side ternary-tree partitioning.

As proposed in [3], tree types other than quad-tree and binary-tree are supported. In the implementation, two more ternary tree (TT) partitions, i.e., horizontal and vertical center-side ternary-trees are introduced, as shown in FIG. 6D and FIG. 6E.

FIGS. 6A-6E shows the following examples: (a) quad-tree partitioning (b) vertical binary-tree partitioning (c) horizontal binary-tree partitioning (d) vertical center-side ternary-tree partitioning (e) horizontal center-side ternary-tree partitioning.

In [3], there are two levels of trees, region tree (quad-tree) and prediction tree (binary-tree or ternary-tree). A CTU is firstly partitioned by region tree (RT). A RT leaf may be further split with prediction tree (PT). A PT leaf may also be further split with PT until max PT depth is reached. A PT leaf is the basic coding unit. It is still called CU for convenience. A CU cannot be further split. Prediction and transform are both applied on CU in the same way as JEM. The whole partition structure is named 'multiple-type-tree'.

3. Drawbacks of Existing Solutions

The prior design of partition trees, such as QTBT or TT have shown much higher coding gains. However, they may also have the following problems:

Both of BT and TT are trying to reduce the number of partitions for a block (either 2 or 3 partitions instead of 4 partitions introduced by QT). For regions with high texture, it may prefer much more partitions (e.g., smaller partitions). With the current design, it may require quite a lot of bits to achieve this.

Instead of modifying the number of partitions, it is also possible that we could modify the quad-tree partitions to cover different cases. The current quad-tree partition always splits one N×N square block into four N/2×N/2 sub-blocks. Introducing more partition patterns may bring additional coding gains.

4. Example Embodiments

Embodiments of the disclosed technology described different partitioning structures, such as extended quad trees (EQT).

In the following descriptions, it should be noted that only a partition structure is allowed for a certain depth/level, the indication of the usage of such a partition structure may be signaled. In other words, it will automatically skip the signaling of a partition structure if it is disallowed for a certain depth/level. The proposed methods could be applied separately, or combined with each other or combined with existing technologies.

Example 1: An extended quad tree (EQT) partitioning structure is proposed which is corresponding to a block partitioning process including an extended quad tree partitioning process for the block of video data, wherein the extended quad partitioning structure represents partitioning the block of video data into final sub-blocks, and when the extended quad tree partitioning process decides to apply extended quad tree partition to one given block, said one given block is always split into four sub-blocks; decoding the final sub-blocks based on the video bitstream; and decoding the block of video data based on the final sub-blocks decoded according to the EQT structure derived.

Example 1A: The EQT partitioning process can be applied to a given block recursively to generate EQT leaf nodes. Alternatively, when EQT is applied to a certain block, for each of the sub-block due to EQT, it may further be split into BT and/or QT and/or TT and/or EQT and/or other kinds of partition trees.

Example 1B: In one example, EQT and QT may share the same depth increment process and same restrictions of leaf node sizes. In this case, the partitioning of one node could be implicitly terminated when the size of the node reaches a minimally allowed quad tree leaf node size or EQT depth with the node reaches a maximally allowed quad tree depth.

Example 1C: Alternatively, EQT and QT may share different depth increment processes and/or restrictions of leaf node sizes. The partitioning of one node by EQT is implicitly terminated when the size of the node reaches a minimally allowed EQT leaf node size or EQT depth associated with the node reaches a maximally allowed EQT depth. In one example, furthermore, the EQT depth and/or the minimally allowed EQT leaf node sizes may be signaled in sequences parameter set (SPS), and/or picture parameter set (PPS), and/or slice header, and/or CTU, and/or regions, and/or tiles, and/or CUs.

Figure 7B:
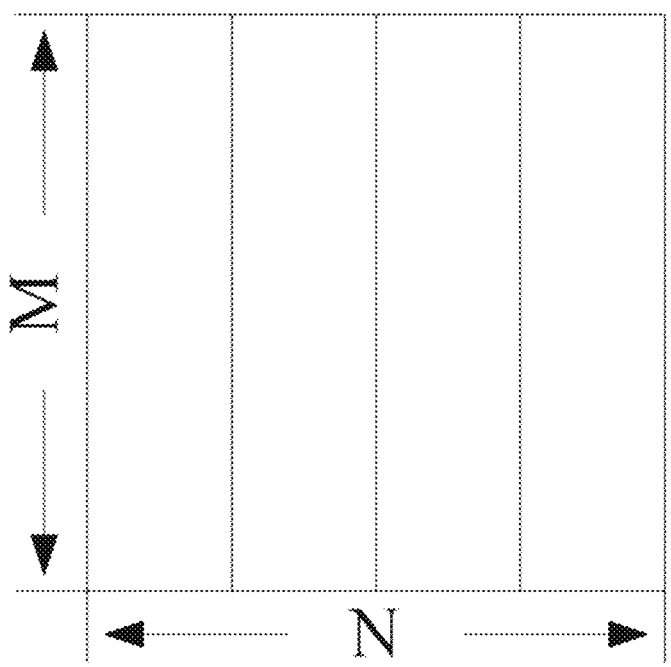
Figure 7A:
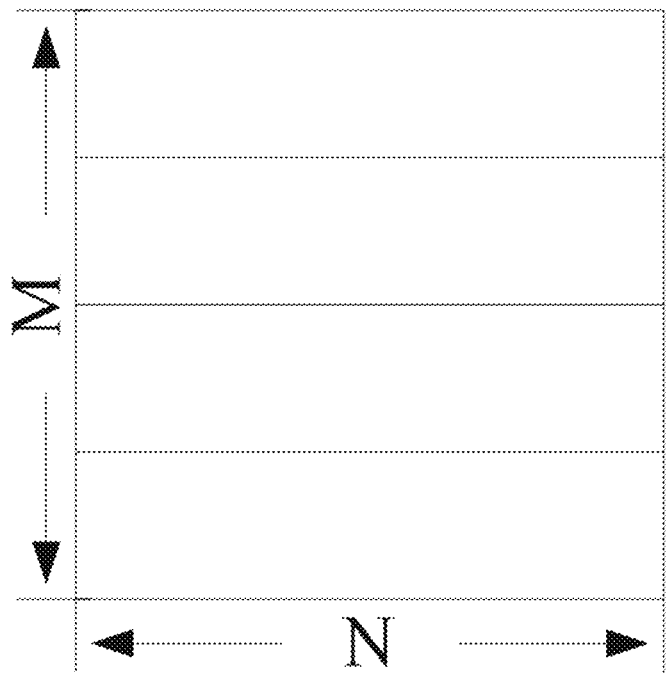

Example 1D: It is proposed that a block with M×N (M and N are non-zero positive integer values, either equal or unequal) size may be split equally into four partitions, such as M/4×N or M×N/4 (examples are depicted in FIG. 7A and FIG. 7B) or split equally into four partitions and the partition size is dependent on the maximum and minimum values of M and N. In one example, one 4×32 block may be split into four 4×8 sub-blocks while a 32×4 block may be split into four 8×4 sub-blocks.

Example 1E: Alternatively, a block with M×N (M and N are non-zero positive integer values, either equal or unequal) size may be split unequally into four partitions, such as two partitions are with size equal to $(M*w0/w)\times(N*h0/h)$ and the other two are with $(M*(w-w0)/w)\times(N*(h-h0)/h)$.

Figure 7C:
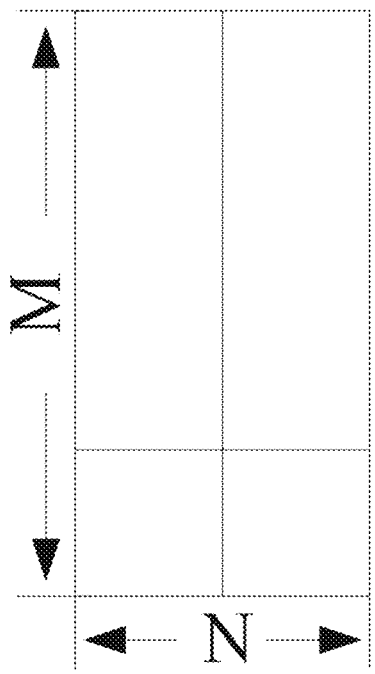
Figure 7D:
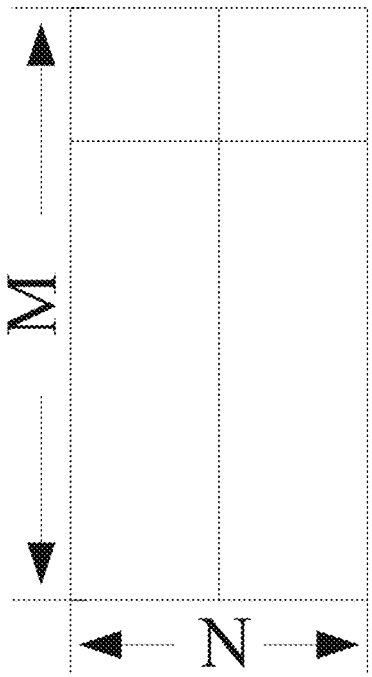
Figure 7E:
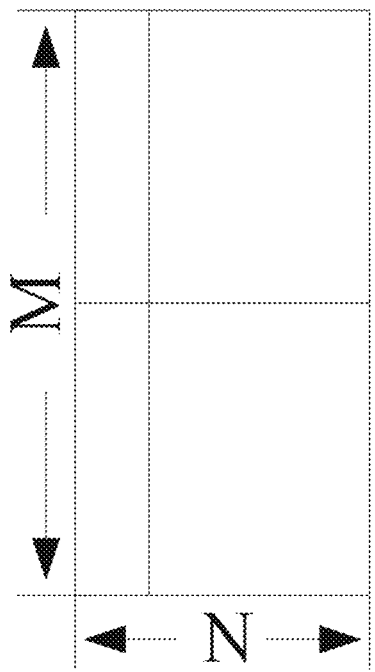
Figure 7F:
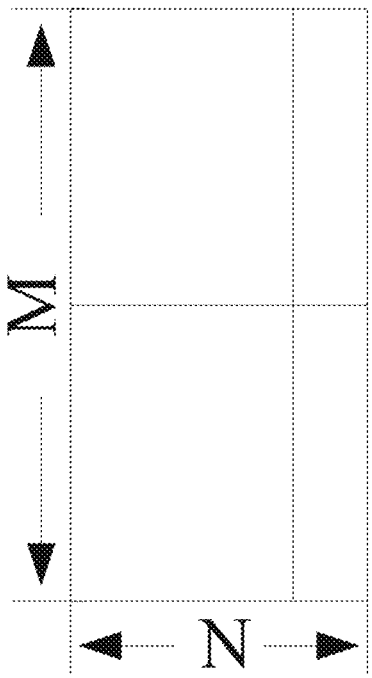

For example, w0 and w may be equal to 1 and 2, respectively that is the width is reduced by half while the height could use other ratios instead of 2:1 to get the sub-blocks. Examples for this case are depicted in FIG. 7C and FIG. 7E. Alternatively, h0 and h may be equal to 1 and 2, respectively, that is the height is reduced by half while the width could use other ratios instead of 2:1. Examples for this case are depicted in FIGS. 7D and 7F.

Figure 7G:
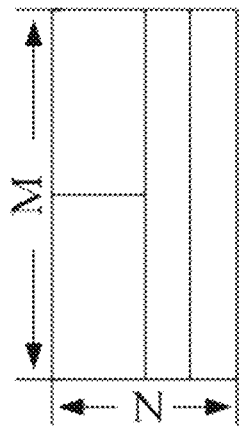
Figure 7G:
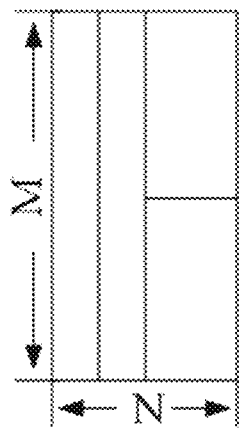
Figure 7G:
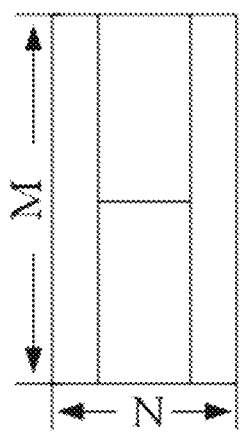
Figure 7H:
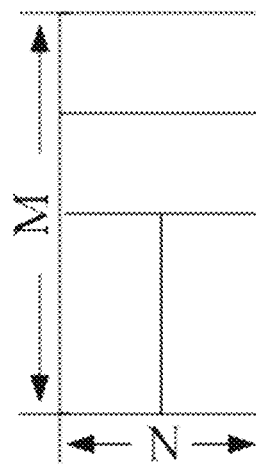
Figure 7H:
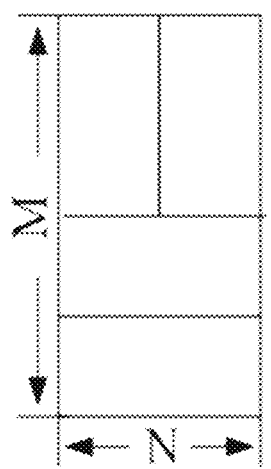
Figure 7H:
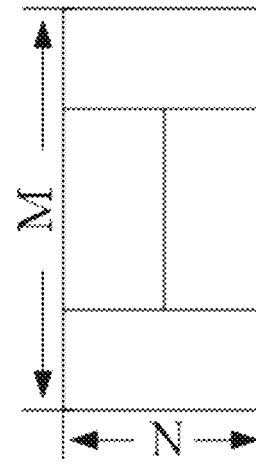

FIG. 7G and FIG. 7H show two alternative examples of extended quad tree partitioning.

FIG. 7I shows a more general case of extended quad tree partitioning with different shapes of partitions wherein each partition may have its own size.

FIG. 7J and FIG. 7K show general examples of FIGS. 7A and 7B wherein the four partitions (c) sub-block width fixed to be M/2, height equal to N/4 or 3N/4, smaller for top two partitions (d) sub-block height fixed to be N/2, width equal to M/4 or 3M/4, smaller for left two partitions may have different sizes, (e) sub-block width fixed to be M/2, height equal to 3N/4 or N/4, smaller for bottom two partitions, (f) sub-block height fixed to be N/2, width equal to 3M/4 or M/4, smaller for right two partitions, (g) M×N/4 and M/2×N/2; (h) N×M/4 and N/2×M/2, (i) M1×N1, (M−M1)×N1, M1×(N−N1) and (M−M1)×(N−N1), (j) M×N1, M×N2, M×N3 and M×N4, where and N1+N2+N3+N4=N, and (k) M1×N, M2×N, M3×N and M4×N where M1+M2+M3+M4=M.

Figure 8A:
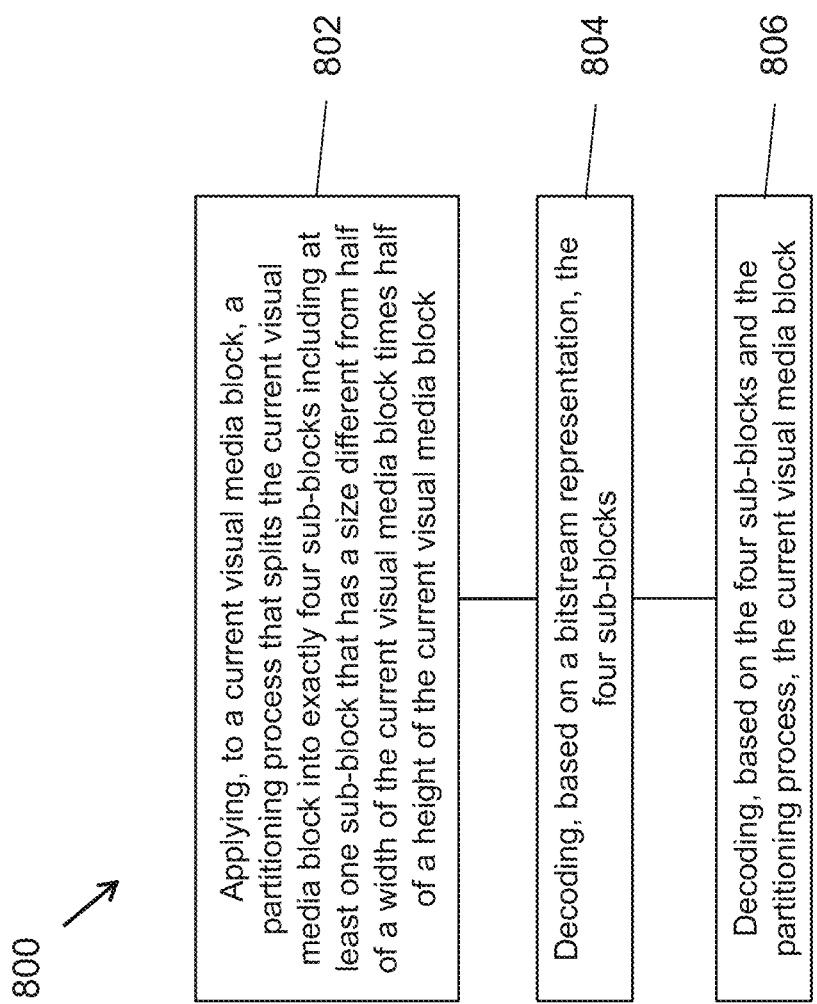
FIG. 8A is a flowchart showing an example of a method of visual media decoding.

FIG. 8A is a flowchart representation of a visual media decoding method 800. The visual media may be a video or a single image. The method 800 includes, at step 802, applying, to a current visual media block, a partitioning process that splits the current visual media block into exactly four sub-blocks including at least one sub-block that has a size different from half of a width of the current visual media block times half of a height of the current visual media block. In some embodiments, a size of the current visual media block is M×N, M and N are positive integers.

In some embodiments, the size of the at least one sub-block is based on a minimum value between M and N, or a maximum value between M and N.

The method 800 includes, at step 804, decoding, based on a bitstream representation, the four sub-blocks.

The method 800 includes, at step 806, decoding, based on the four sub-blocks and the partitioning process, the current visual media block.

Figure 8B:
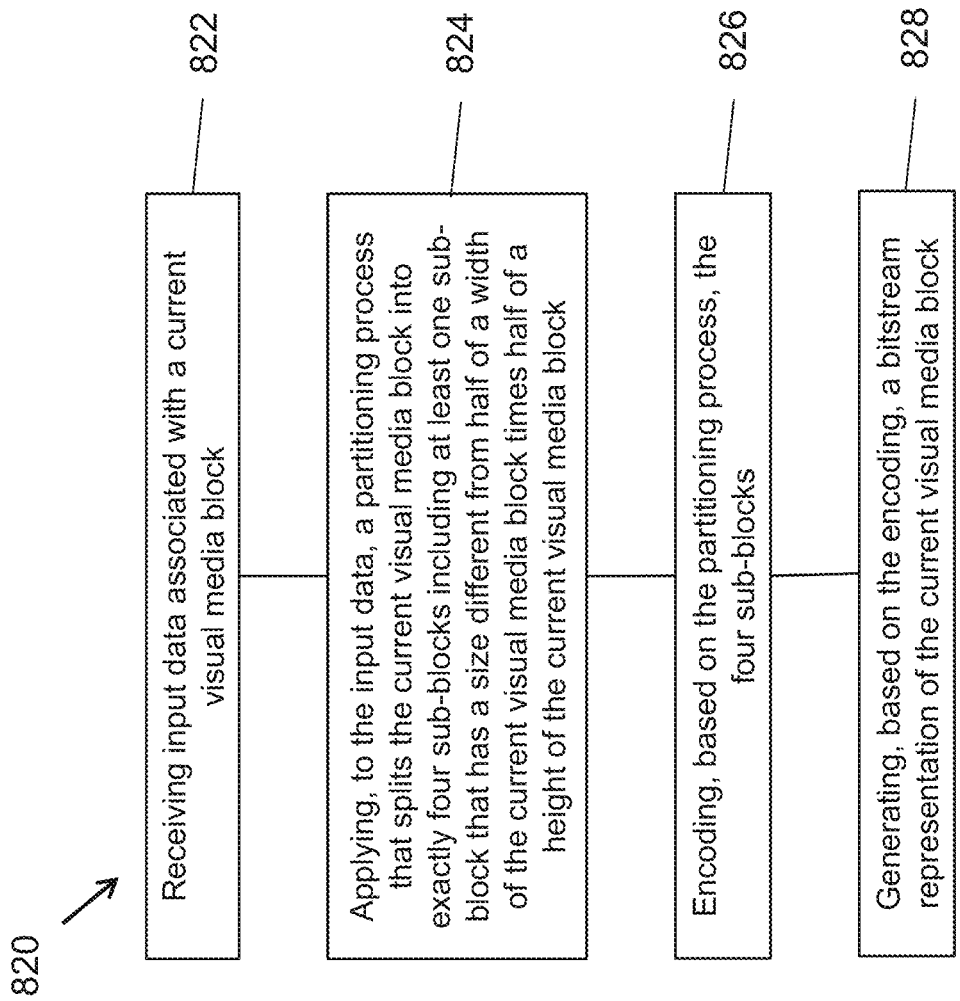
FIG. 8B is a flowchart showing an example of a method of visual media encoding.

FIG. 8B is a flowchart representation of a visual media encoding method 820. The visual media may be a video or a single image. The method 820 includes, at step 822, receiving input data associated with a current visual media block.

The method 820 includes, at step 824, applying, to the input data, a partitioning process that splits the current visual media block into exactly four sub-blocks including at least one sub-block that has a size different from half of a width of the current visual media block times half of a height of the current visual media block. In some embodiments, a size of the current visual media block is M×N pixels, M and N are positive integers.

In some embodiments, the size of the at least one sub-block is based on a minimum value between M and N, or a maximum value between M and N.

The method 820 includes, at step 826, encoding, based on the partitioning process, the four sub-blocks.

The method 820 includes, at step 828, generating, based on the encoding, a bitstream representation of the current visual media block.

In some embodiments, a sub-block is a leaf node.

In some embodiments, a size of each of the four sub-blocks is (M/4)×N. In an example, M=32 and N=4.

In some embodiments, a size of each of the four sub-blocks is M×(N/4). In an example, M=4 and N=32.

In some embodiments, a first size of a first sub-block and a second sub-block of the four sub-blocks is (M*w0/w)×(N*h0/h), and a second size of a third sub-block and a fourth sub-block of the four blocks is (M*(w−w0)/w)×(N*(h−h0)/h), where w, h, w0 and h0 are positive integers, and w0≤w and h0≤h. In an example, w0=1, w=2, h0=1 and h=4. In another example, h0=1, h=2, w0=1 and w=4.

In some embodiments, sizes of the four sub-blocks are Mi×N, wherein i=1, 2, 3, 4, and wherein M1+M2+M3+M4=M.

In some embodiments, sizes of the four sub-blocks are M×Ni, wherein i=1, 2, 3, 4, and wherein N1+N2+N3+N4=N.

In some embodiments, a height (H) and a width (W) of the current visual media block are integers, and the four sub-blocks have dimensions H×W/4, H/2×W/2, H/2×W/2 and H×W/4. In an example, a top-left coordinate of the current visual media block is denoted (x, y), and the four sub-blocks have top-left coordinates and dimensions given as: (i) top-left coordinate (x, y) with dimensions H×W/4; (ii) top-left coordinate (x+W/4, y) with dimensions H/2×W/2; (iii) top-left coordinate (x+W/4, y+H/2) with dimensions H/2×W/2; and (iv) top-left coordinate (x+3×W/4, y) with dimensions H×W/4.

In some embodiments, a height (H) and a width (W) of the current visual media block are integers, and the four sub-blocks have dimensions H/4×W, H/2×W/2, H/2×W/2 and H/4×W. In an example, a top-left coordinate of the current visual media block is denoted (x, y), and the four sub-blocks have top-left coordinates and dimensions given as: (i) top-left coordinate (x, y) with dimensions H/4×W; (ii) top-left coordinate (x, y+H/4) with dimensions H/2×W/2; (iii) top-left coordinate (x+W/2, y+H/4) with dimensions H/2×W/2; and (iv) top-left coordinate (x, y+3×H/4) with dimensions H/4×W.

Figure 9:
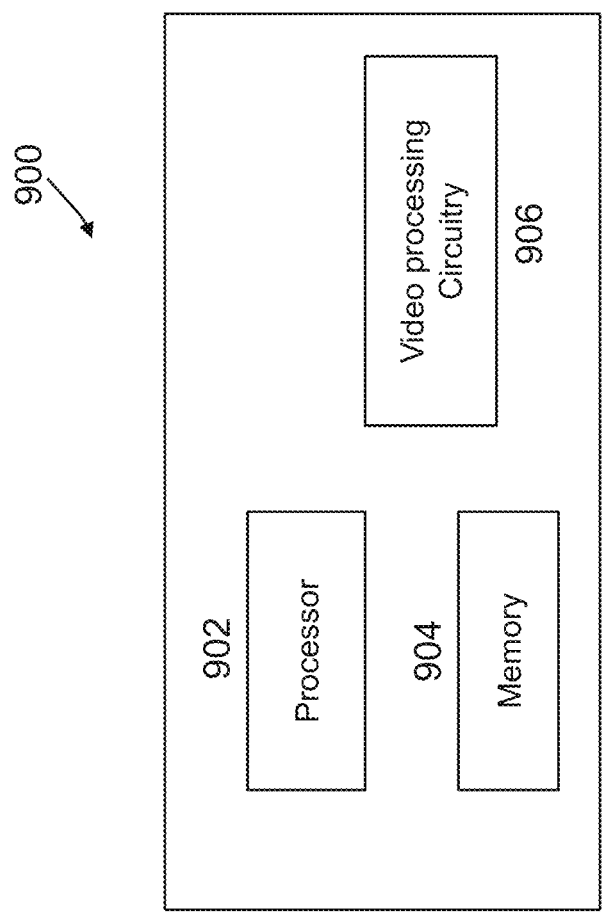
FIG. 9 is a block diagram of an example of a hardware platform for implementing a visual media decoding or a visual media encoding technique described in the present document.

FIG. 9 shows a block diagram of an example embodiment of a hardware device 900 that can be utilized to implement various portions of the presently disclosed technology. The hardware device 900 can be a laptop, a smartphone, a tablet, a camcorder, or other types of devices that are capable of processing videos. The device 900 includes a processor or controller 902 to process data, and memory 904 in communication with the processor 902 to store and/or buffer data. For example, the processor 902 can include a central processing unit (CPU) or a microcontroller unit (MCU). In some implementations, the processor 902 can include a field-programmable gate-array (FPGA). In some implementations, the device 900 includes or is in communication with a graphics processing unit (GPU), video processing unit (VPU) and/or wireless communications unit for various visual and/or communications data processing functions of the smartphone device. For example, the memory 904 can include and store processor-executable code, which when executed by the processor 902, configures the device 900 to perform various operations, e.g., such as receiving information, commands, and/or data, processing information and data, and transmitting or providing processed information/data to another device, such as an actuator or external display. To support various functions of the device 900, the memory 904 can store information and data, such as instructions, software, values, images, and other data processed or referenced by the processor 902. For example, various types of Random Access Memory (RAM) devices, Read Only Memory (ROM) devices, Flash Memory devices, and other suitable storage media can be used to implement storage functions of the memory 904. The device 900 may further include dedicated video processing circuitry 906 for performing repetitive computational functions such as transforms and decoding. In some embodiments, the video processing circuitry 906 may be implemented internal to the processor 902. In some embodiments, the video processing circuitry 906 may be a graphics processor unit (GPU).

Various possible variations and additions to the methods 800 and 820 are described in the examples in Section 2 and the claim section of the present document. For example, a receiving operation may include receiving the bitstream that is locally stored or receiving the bitstream over a network connection (e.g., streaming reception). For example, a deriving operation may be implemented by parsing bits in the video bitstream using a priori knowledge of protocol syntax for the video bitstream. The decoding operations may include generating uncompressed pixel values (luma and or color) from compressed or encoded bit representation of the video.

In some embodiments, a video visual media decoding process may generate decoded video data that may be stored in video buffer and displayed on a user interface for viewing by a user. In some embodiments, a visual media encoding process may be performed on video that is either in uncompressed or lightly compressed format, e.g., captured from a camera device or a digital storage device, and so on.

Improvements achieved by incorporating embodiments of the disclosed technology into HEVC reference software are shown in the experimental results below. The test sequences include HEVC standard test sequences in common test conditions (CTC), which are specified by JCT-VC (Joint Collaborative Team on Video Coding).

| Class | Sequence | Main-Tier | | | Low-Tier | | |
|---|---|---|---|---|---|---|---|
| | | RA | LDP | LDB | RA | LDP | LDB |
| A1 | Tango | −3.20% | −3.19% | −3.01% | −3.24% | −3.84% | −3.78% |
| | Drums100 | −4.21% | −4.07% | −3.63% | −4.80% | −5.00% | −4.98% |
| | CampreParty2 | −2.07% | −1.89% | −1.76% | −2.89% | −2.96% | −2.92% |
| | CatRobot | −4.07% | −4.28% | −4.03% | −3.92% | −5.09% | −4.62% |
| A2 | TrafficFlow | −3.88% | −3.78% | −3.34% | −3.88% | −3.20% | −3.25% |
| | DaylightRoad | −4.18% | −4.22% | −3.98% | −3.87% | −4.39% | −4.06% |
| | Kimino | −2.36% | −2.68% | −2.40% | −2.51% | −3.40% | −3.06% |
| | ParkScene | −3.13% | −3.32% | −3.05% | −3.32% | −4.20% | −4.02% |
| B | Cactus | −3.16% | −3.12% | −3.03% | −3.68% | −4.09% | −4.14% |
| | BQTerrace | −3.24% | −3.24% | −2.58% | −3.70% | −3.49% | −3.62% |

-continued

| Class | Sequence | Main-Tier | | | Low-Tier | | |
|---|---|---|---|---|---|---|---|
| | | RA | LDP | LDB | RA | LDP | LDB |
| | BasketballDrive | −3.25% | −3.01% | −2.63% | −3.88% | −4.11% | −3.78% |
| | RaceHorsesC | −3.29% | −2.58% | −2.56% | −4.37% | −3.79% | −3.87% |
| C | BQMall | −3.50% | −3.36% | −3.33% | −4.22% | −5.07% | −4.83% |
| | PartyScene | −2.68% | −2.28% | −2.47% | −3.05% | −3.61% | −3.59% |
| | BasketballDrill | −3.22% | −2.89% | −2.92% | −3.95% | −3.84% | −3.84% |
| | RaceHorses | −3.17% | −2.60% | −2.55% | −3.92% | −3.88% | −3.84% |
| D | BQSquare | −2.16% | −2.38% | −2.27% | −2.34% | −2.40% | −2.49% |
| | BlowingBubbles | −2.65% | −2.42% | −2.71% | −2.61% | −3.31% | −3.44% |
| | BasketballPass | −2.75% | −2.46% | −2.39% | −3.72% | −4.07% | −3.90% |
| | FourPeople | −3.46% | −4.18% | −4.06% | −3.40% | −4.64% | −4.46% |
| E | Jonny | −2.94% | −4.36% | −4.56% | −2.86% | −3.60% | −3.36% |
| | KristenAndSara | −3.23% | −4.15% | −4.18% | −3.10% | −3.76% | −4.06% |
| | Average | −3.17% | −3.20% | −3.06% | −3.51% | −3.90% | −3.81% |

In the above table, the negative percentages indicate bitrate savings for that particular scenario. The various classes (e.g., Class A1, A2, . . . , E) represent different resolutions of the test sequences, the "Main-Tier" and "Low-Tier" designations represent different bitrate ranges, using quantization parameters (QPs) of {22, 27, 32, 37} and {32, 37, 42, 47}, respectively, and "RA", "LDB" and "LDP" represent different coding conditions.

For example, the resolutions of Classes A1 and A2 are 4K, and the resolutions of Classes B, C, D and E are 1080p, 832×480, 416×240 and 720p, respectively.

For example, "RA" represents random access corresponding to a set of coding conditions designed to enable relatively-frequent random access points in the coded video data, with less emphasis on minimization of delay. In contrast, "LDx" represents low-delay and corresponds to two sets of coding conditions designed to enable interactive real-time communication, with less emphasis on ease of random access. Specifically, "LDB" is a variant of the LD conditions that uses B pictures, and "LDP" is a variant that uses P frames.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of any invention or of what may be claimed, but rather as descriptions of features that may be specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this document should not be understood as requiring such separation in all embodiments.

Only a few implementations and examples are described and other implementations, enhancements and variations can be made based on what is described and illustrated in this document.

What is claimed is:

1. A method of visual media processing, comprising:
applying, during a conversion between a current visual media block and a bitstream representation of the current visual media block, to the current visual media block, a partitioning process that splits the current visual media block into exactly four sub-blocks including at least one sub-block that has a size different from that of another sub-block, wherein a size of the current visual media block is M×N, wherein M and N are positive integers that are powers of 2, and wherein M is unequal to N; and
performing the conversion based on the four sub-blocks and the partitioning process, wherein, in a case that the partitioning process is allowed for a depth/level, an indication of the usage of a corresponding partition structure is signaled.

2. The method of claim 1, wherein sizes of the four sub-blocks are Mi×N, wherein i=1, 2, 3, 4, and wherein M1+M2+M3+M4=M.

3. The method of claim 1, wherein sizes of the four sub-blocks are M×Ni, wherein i=1, 2, 3, 4, and wherein N1+N2+N3+N4=N.

4. The method of claim 2, wherein M1, M2, M3 and M4 are different from each other.

5. The method of claim 3, wherein N1, N2, N3 and N4 are different from each other.

6. The method of claim 1, wherein a first size of a first sub-block and a second sub-block of the four sub-blocks is (M*w0/w)×(N*h0/h), and wherein a second size of a third sub-block and a fourth sub-block of the four blocks is (M*(w-w0)/w)×(N*(h-h0)/h), wherein w, h, w0 and h0 are positive integers, and wherein w0≤w and h0≤h.

7. The method of claim 6, wherein w0=1, w=2, h0=1 and h=4.

8. The method of claim 6, wherein h0=1, h=2, w0=1 and w=4.

9. The method of claim 1, wherein a height (H) and a width (W) of the current visual media block are integers, and wherein the four sub-blocks have dimensions H/4×W, H/2×W/2, H/2×W/2 and H/4×W.

10. The method of claim 9, wherein a top-left coordinate of the current visual media block is denoted (x, y), and wherein the four sub-blocks have top-left coordinates and dimensions given as:
   (i) top-left coordinate (x, y) with dimensions H/4×W;
   (ii) top-left coordinate (x, y+H/4) with dimensions H/2×W/2;
   (iii) top-left coordinate (x+W/2, y+H/4) with dimensions H/2×W/2; and
   (iv) top-left coordinate (x, y+3×H/4) with dimensions H/4×W.

11. The method of claim 1, wherein a height (H) and a width (W) of the current visual media block are integers, and wherein the four sub-blocks have dimensions H×W/4, H/2×W/2, H/2×W/2 and H×W/4.

12. The method of claim 11, wherein a top-left coordinate of the current visual media block is denoted (x, y), and wherein the four sub-blocks have top-left coordinates and dimensions given as:
   (i) top-left coordinate (x, y) with dimensions H×W/4;
   (ii) top-left coordinate (x+W/4, y) with dimensions H/2×W/2;
   (iii) top-left coordinate (x+W/4, y+H/2) with dimensions H/2×W/2; and
   (iv) top-left coordinate (x+3×W/4, y) with dimensions H×W/4.

13. The method of claim 1, wherein the current visual media block comprises a video block.

14. An apparatus in a video system comprising a processor and a non-transitory memory with instructions thereon, wherein the instructions upon execution by the processor, cause the processor to:
apply, during a conversion between a current visual media block and a bitstream representation of the current visual media block, to the current visual media block, a partitioning process that splits the current visual media block into exactly four sub-blocks including at least one sub-block that has a size different from that of another sub-block, wherein a size of the current visual media block is M×N, wherein M and N are positive integers that are powers of 2, and wherein M is unequal to N; and
perform the conversion based on the four sub-blocks and the partitioning process,
wherein, in a case that the partitioning process is allowed for a depth/level, an indication of the usage of a corresponding partition structure is signaled.

15. The apparatus of claim 14, wherein sizes of the four sub-blocks are Mi×N, wherein i=1, 2, 3, 4, and wherein M1+M2+M3+M4=M.

16. The apparatus of claim 14, wherein sizes of the four sub-blocks are M×Ni, wherein i32 1, 2, 3, 4, and wherein N1+N2+N3+N4=N.

17. The apparatus of claim 15, wherein M1, M2, M3 and M4 are different from each other.

18. The apparatus of claim 16, wherein N1, N2, N3 and N4 are different from each other.

19. A non-transitory computer readable media storing instructions that cause a processor to:
apply, during a conversion between a current visual media block and a bitstream representation of the current visual media block, to the current visual media block, a partitioning process that splits the current visual media block into exactly four sub-blocks including at least one sub-block that has a size different from that of another sub-block, wherein a size of the current visual media block is M×N, wherein M and N are positive integers that are powers of 2, and wherein M is unequal to N; and perform the conversion based on the four sub-blocks and the partitioning process, wherein, in a case that the partitioning process is allowed for a depth/level, an indication of the usage of a corresponding partition structure is signaled.

20. A non-transitory computer readable media storing instructions that cause a processor to:

apply, during a conversion between a current visual media block and a bitstream representation of the current visual media block, to the current visual media block, a partitioning process that splits the current visual media block into exactly four sub-blocks including at least one sub-block that has a size different from that of another sub-block, wherein a size of the current visual media block is M×N, wherein M and N are positive integers that are powers of 2, and wherein M is unequal to N; and generate the bitstream representation from the current visual media block based on the four sub-blocks and the partitioning process, wherein, in a case that the partitioning process is allowed for a depth/level, an indication of the usage of a corresponding partition structure is signaled.

* * * * *